Oct. 22, 1935.   R. G. DYKEMAN   2,018,639
FUEL DELIVERY UNIT
Filed May 11, 1931
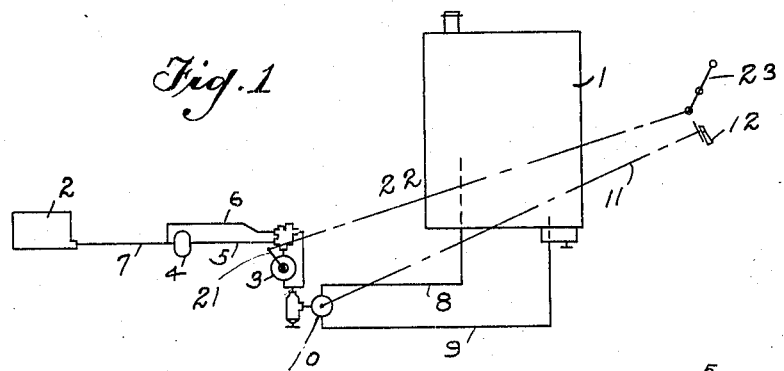
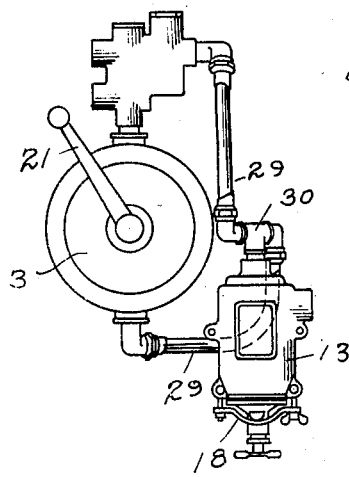
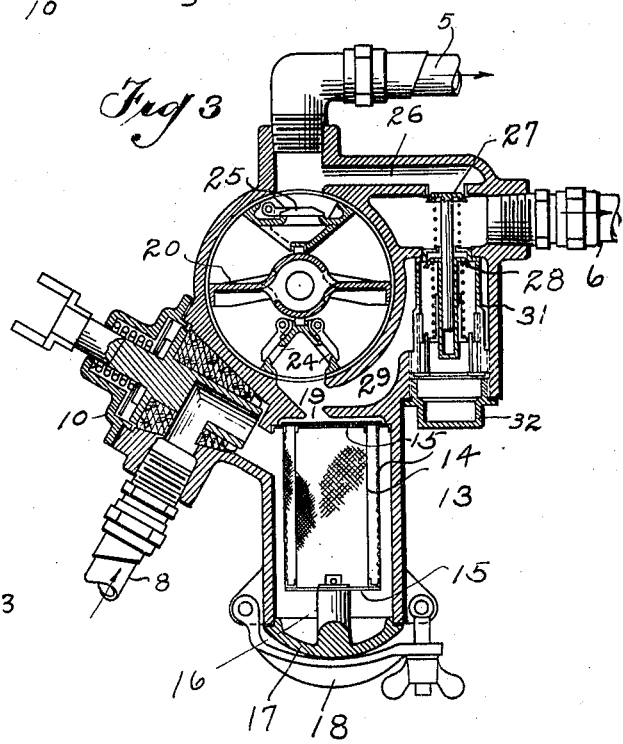
Inventor
Reuben G. Dykeman
By F. L. Walker
Attorney Patented Oct. 22, 1935

2,018,639

UNITED STATES PATENT OFFICE 2,018,639

FUEL DELIVERY UNIT

Reuben G. Dykeman, Dayton, Ohio, assignor to United Aircraft Products, Incorporated, Dayton, Ohio, a corporation of Ohio Application May 11, 1931, Serial No. 536,479

12 Claims. (Cl. 103—5)

This invention relates to automatic fuel supply systems for motor vehicles, and more particularly to a suction system wherein the fuel tank is located at a normally lower level than the carburetor and affording insufficient head for gravity operation. The system is especially applicable to aircraft operation but is not limited to such use, as it may be applied to automobile operation or to special stationary motor installations.

The invention is embodied in a unitary structure in which are combined the essential fuel system accessories including the fuel cock, strainer, hand operated starting and emergency pump, pressure relief valve and by-pass valve, the unit being directly connected with the engine driven fuel supply pump, and source of fuel supply.

One object of the invention is to simplify the construction as well as the means and mode of operation of automatic fuel systems whereby such apparatus will not only be cheapened in construction, but will be more efficient in use, automatic in action, afford a uniform fuel supply and be unlikely to get out of order.

A further object of the invention is to combine the various elements or accessories into a compact integral unit in which the parts are directly connected or integrally united, thereby eliminating numerous joints of tubing, pipe and nipple connections which are subject to leakage and resulting fire hazard.

A further object of the invention is to minimize the bulk and weight of such fuel system by providing a compact integral unitary structure.

A further object of the invention is the utilization of a high velocity flow of fuel in a circuitous path to siphon additional fuel from the supply tank.

A further object of the invention is to so arrange the system as to minimize the entrapment of air, thereby avoiding loss of suction of the engine driven fuel pump, necessitating repriming, and preventing pressure fluctuations.

Further important objects of the invention are the embodiment of a novel relation of relief and by-pass valves and provision of untrapped straight line flow from the discharge to the suction side of the hand or priming pump.

With the above primary and other incidental objects in view as will more fully appear in the specification, the invention consists of the features of construction, the parts and combinations thereof, and the mode of operation, or their equivalents, as hereinafter described and set forth in the claims.

In the accompanying drawing wherein are shown the preferred but obviously not the only forms of the embodiment of the invention, Fig. 1 diagrammatically illustrates a typical fuel system installation for an airplane and disposition of the several elements relative to the supply tank and engine carburetor. Fig. 2 illustrates the assembly of the present fuel system unit from independent parts and stock connections. Fig. 3 is a vertical sectional view of the integral unitary assembly of the fuel system elements embodying the present invention.

Like parts are indicated by similar characters of reference throughout the several views.

Briefly stated in the present system the fuel drawn from the supply tank 1 is initially supplied to the carburetor 2 by a hand pump 3 until the engine is set in operation whereupon the fuel supply is drawn from the supply tank by an engine driven pump 4. The hand pump is connected by the conduit 5 directly with the engine driven pump 4 which when initiating operation obstructs the flow of fuel and causes a back pressure which reacts upon a by-pass valve controlling the by-pass conduit 6 through which fuel is supplied around the engine driven pump 4 to the conduit 7 leading from the engine driven pump to the carburetor 2. The engine being thus initially supplied with fuel drives the pump 4 which has a capacity several times the engine requirement, the excess fuel being returned under pressure through the by-pass conduit 6 to the present unit where it is discharged across the fuel intake orifice to the hand pump, thereby creating a suction or syphon effect by which additional fuel is drawn from the supply tank to replace that consumed by engine operation and to maintain the high velocity circulating stream of fuel at full value. By this means a constant uniform fuel supply is maintained at the carburetor.

The unit may be assembled from separate parts interconnected by standard pipe fittings and tubing as illustrated in Fig. 2, but is preferably constructed as an integral body proportioned and chambered to contain the several operating parts in compact relation as illustrated in Fig. 3. The function and operation of the two forms of assembly are substantially the same.

Referring in detail to the construction, fuel is supplied from the tank 1 through either the main supply conduit 8 or the emergency supply conduit 9 to the control valve or fuel cock 10 which is controlled from a distant point in the fuselage by a link or torque tube 11 and handle 12, as diagrammatically illustrated in Fig. 1.

In connection with the inlet pipes 8 and 9 to the tank or reservoir 1, the fuel is supplied through the pipe 8 from the source of supply 1 to the fuel unit. When the level in the supply tank 1 falls below the level of the pipe 8 extending into the tank the pilot switches the valve so as to utilize the pipe 9 for supplying fuel to the unit. The fuel remaining below the level of the pipe 8 is referred to as a reserve supply. When the level falls below the pipe 8 the pilot is then warned that the supply is running low and is using the reserve. This permits the pilot to land for additional fuel, if this is possible, during the time that the reserve is used.

The throttle valve or fuel cock 10 discharges into a strainer compartment 13 in which is located one or more strainer screens 14 of any suitable type. In the present construction they have been shown as of cylindrical form and concentrically arranged in spaced relation with each other and with the walls of the strainer compartment whereby an annular space is afforded for the free circulation of fuel around the screens 14 and therebetween. The screens are supported between spacing heads 15, the lower head being supported upon a stud 16 projecting from a removable bottom closure 17 for the strainer compartment. This removable bottom 17 is held in adjusted position by a clamp arm 18. At the top of the strainer compartment is an outlet port 19 communicating with the interior of the inner screen member 14 and through which the supply of fuel is drawn.

The hand operated pump 3 may be of any suitable form, that illustrated being of a double acting oscillating type. The rocking impeller or piston 20 is actuated by a rock arm 21 connected by a link 22 with a distantly located hand lever 23 if operating conditions so require, as diagrammatically illustrated in Fig. 1.

The actuating of the rocking impeller draws fuel into the pump chamber alternately through the respective suction valves 24 and discharges it through the discharge valves 25 at the top of the pump chamber, of which only one valve is shown, the other being in the same plane and behind that illustrated.

The outlet from the pump 3 is directly connected with the engine operated pump 4 through the conduit 5. A branch conduit 26 leading from the conduit 5 in the top of the unit communicates through a spring actuated by-pass valve 27 with the auxiliary conduit 6, through which fuel is initially by-passed to the carburetor 2 around the engine driven pump 4 and through which the excess fuel is returned from the pump 4 when the latter is in operation.

A spring tensioned relief valve 28 is interposed between the conduit 6 and a return passage 29 which leads back to the intake orifice of the priming pump 3 and past the outlet orifice 19 of the strainer 13. The flow of fuel at high velocity through the passage 29 has a Venturi tube or injector effect producing a syphon action or suction through the strainer compartment 13 and thus drawing fuel therethrough to replace that consumed. In the assembled construction illustrated in Fig. 2 the return conduit 29 is a pipe with leads to the intake of the pump 3 and communicates through a T fitting 30 with the top of the strainer 13. The high velocity flow of fuel through the pipe 29 and past the T connection, under influence of the engine driven pump induces the flow through the strainer 13 of the required quantity of added fuel.

As illustrated in Fig. 3 the flow of fuel from the strainer through the pump chamber to the conduit 5 is in a substantially straight line.

To economize space and weight, the by-pass valve 27 and the relief valve 28 are preferably, though not necessarily, concentrically disposed with the stem of the by-pass valve 27 telescoping within the hollow stem of the relief valve 28. Each valve is provided with its independent actuating spring against the tension of which the valve is opened by back pressure of the fluid. The relief valve 28 is mounted in a removable cage 31 accessible upon removal of the closure plug 32 from the unit.

*Operation.*—In the cycle of operation the throttle valve or cock 10 being opened, the hand pump 3 upon hand operation draws fuel through the strainer 13 from the tank 1. The fuel is discharged from the hand pump 3 through the conduit 5 to the engine driven pump 4, which not being in operation obstructs the flow of fuel and creates a back pressure in the conduit 5. Under influence of back pressure within the conduit 5 and branch conduit 26 the spring tensioned by-pass valve 27 is unseated permitting escape of the fuel into the auxiliary conduit 6 which communicates with the conduit 7 beyond the engine driven pump 4 and so supplies fuel to the carburetor 2 until the engine is in operation. Thereafter the pump 4 will be operated by engine power and the hand operation of the primer pump 3 is discontinued. The engine operated pump then draws an excessive supply of fuel through the valves of the hand pump 3 and conduit 5 delivering into the conduit 7 approximately four times the quantity of fuel required for the engine operation. This insures at all times the maximum requirement of fuel at the carburetor 2.

The excess fuel supplied by the pump 4 is by-passed through the conduit 6 back to the present unit. The back pressure through the conduit 6 augments the tension spring to maintain the by-pass valve 27 closed, but at the same time forces open the relief valve 28 against the tension of its spring, and the excess fuel is returned thence through the passage 29 to the intake of the pump 3. Thus in addition to maintenance of a maximum fuel supply at the carburetor, there is established and maintained a high velocity circuit of fuel from the pump 3 through the conduit 5 to the pump 4 and therethrough into the conduit 7, returning through the by-pass conduit 6 and relief valve 28 and through the passage 29 back to the intake of the pump 3.

In passing over the outlet orifice from the strainer 13 the high velocity current of fuel exerts a syphon or injector effect upon the fuel which materially aids in replenishing the supply and compensates for the fuel released through the carburetor to the engine.

The flow of fuel from the supply tank through the strainer into the circulatory system is but substantially one fourth of the capacity of the engine driven pump, and with the conduit sizes and openings being equal, the high velocity flow through the Venturi passage 29 and past the outlet from the strainer is substantially three times the quantity flowing through such outlet port from the strainer thus affording a pronounced jet or syphon effect which effects withdrawal of additional fuel as required from the strainer.

The fuel supply to the carburetor is maintained under constant pressure and there are no pockets for entrapment of air which might become entrained with the fuel supply forming bubbles with resulting fluctuation of pressure.

The hand pump is used for starting and also in emergency for maintaining a fuel supply to the engine driven pump 4 in the event of failure of such engine driven pump.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention, I claim:

1. In a fuel system of the character described, a source of supply, a chamber connected therewith and a pair of delivery outlets from said chamber, a circuitous path of travel for fuel intermediate one of the delivery outlets and the source of supply, a release valve in said path, means including a restricted orifice having an injector action for maintaining a high velocity flow through such circuitous path of a quantity of fuel in excess of the delivery requirement of the system whereby additional fuel will be drawn by syphon effect from such source of supply and delivered to the outlets under pressure.

2. In a fuel delivery system, a pump having an output capacity in excess of the delivery requirement of the system, a booster unit, a by-pass conduit for returning the excess fuel to the intake side of said booster unit, a source of supply for fuel and an outlet conduit extending from the booster unit to the pump, said booster unit including a Venturi passage having an intake communicating with the by-pass conduit, said passage connecting with said source of supply through which only the excess fuel is returned from the pump at high velocity and thereby effecting a siphon effect upon the fuel supply.

3. In a delivery system for liquids as described, a power pump having a discharge capacity in excess of the delivery requirement of the system, a supply conduit leading thereto, a return conduit leading from the discharge side of the pump and discharging into the supply conduit only the excess liquid and forming therewith a circuitous path through which the excess liquid is circulated at high velocity, and a booster unit including injector means cooperating with the return conduit for creating a vacuum for automatically supplying additional liquid to the quantity being circulated to compensate for the delivery requirement of the system, said booster unit having a main outlet conduit connected to the power pump and an auxiliary outlet passage communicating with said return passage for supplying fuel when the power unit is inoperative.

4. In a device of the character described, a single unitary body including a chamber having an inlet port and a pair of discharge outlets, one of which is the main outlet and the other an auxiliary outlet, a return passage within said body leading from one of the discharge outlets to the inlet port, and a branch passage connecting said discharge outlets, means within said body for inducing a flow of liquid through the chamber, and a pair of independently pressure operable valves within said body disposed in aligned relation in said return passage and disposed on opposite sides of the branch passage, one of said valves controlling one of said outlets and the other valve controlling the return passage, one of said valves having a hollow stem within which the stem of the other valve is telescopically adjustable, and separate retracting springs for the respective valves.

5. In a device of the character described, a single unitary body including a chamber having an inlet passage and discharge outlet, a return passage within said body leading from the discharge passage to the inlet passage, means within said body for inducing a flow of liquid through the chamber, and a pair of independently operable valves disposed in aligned relation connected in the juncture of the discharge and the return passage, one of said valves having a hollow stem within which the stem of the other valve is telescopically adjustable, and separate retracting springs for the respective valves, one of said valves controlling the outlet passage and the other the return passage.

6. In a device for supplying fuel to an engine, including a motor driven pump located adjacent the engine, a booster located adjacent the fuel supply for forcing the fuel from the fuel supply to the motor driven pump, said booster including a single unitary body having a chamber provided with an inlet port and two discharge outlets, one of said outlets connected to the inlet of the motor driven pump, a return passage from the other discharge outlet to the inlet port, and a branch passage connecting said one of said outlets with the return passage, a pair of independently operable pressure valves disposed in the branch and return passage ways respectively, one of said valves controlling said other outlet passage and the other valve controlling the return passage, a restricted orifice formed in the return passage to form an injector maintaining a sufficient fuel pressure to prevent excessive evaporation of the fuel between the booster and the motor driven pump.

7. In a fuel delivery system for an engine for delivering fuel thereto from a remote fuel supply, comprising a motor driven pump located adjacent the engine for creating a suction drawing the fuel from said remote fuel supply, and a booster including a hand pump for emergency use located intermediate the pump and the source of fuel supply for drawing fuel from said remote source of supply and delivering same to said motor driven pump, said booster including an injector comprising in part an excess fuel return line from the motor driven pump to the inlet of the booster pump for reducing the suction intermediate the hand pump and the source of fuel supply.

8. In a fuel delivery system for supplying fuel to an engine from a remote fuel supply, a pump located near the engine creating a suction for drawing the fuel from said source, and a booster including a hand pump for emergency use intermediate said pump and said source of fuel supply, said booster hand pump having a single inlet and two discharge outlets, a return passage from one of said outlets to the booster inlet, said booster having a pair of independently pressure operable valves disposed in aligned relation in said one of said discharge outlets and return passage respectively, one of said valves controlling one of said outlets and the other valve controlling the return passage and an inlet port in said booster forming with said return passage an injector for reducing the suction intermediate said booster and said pump.

9. In a device of the character described, a body including a chamber having an inlet passage and a pair of discharge passages leading from said chamber means for producing a flow of fluid through said passages, a return passage from one of the discharge passages to the inlet passage, a pair of telescopically arranged pressure operable valves disposed in aligned relation in said return passage, which is formed as a jet injector where it communicates with the inlet of said chamber cooperating with said means to maintain a predetermined pressure in said device, one of said valves controlling one of said discharge passages and the other valve controlling the return passage.

10. In a device of the character described a pump, a pump housing having an inlet port and two discharge outlets, a branch passage leading from one discharge outlet to the other, a pressure operated valve in said passage, a return passage from said second discharge outlet to the inlet port arranged to have an injector effect, said return passage including a pressure operated valve.

11. In a device of the character described, a hand operated pump and a power driven pump connected in series, said hand operated pump connected to a main fuel supply, the outlet of the hand operated pump being connected to the input of the power operated pump, an excess fluid return passage leading from the outlet of the power operated pump to the inlet of the hand operated pump, said passage being arranged as an injector at the inlet of the hand operated pump so that as excess fluid is returned from the power driven pump the force of said returned fluid is utilized to supply pressure to the main fluid supply at a point intermediate the inlet of the hand operated pump and the main fluid supply, a pressure operated relief valve in the return passage and a branch passage connecting the outlet of the hand pump with said return passage permitting the return of excess fluid by the hand operated pump.

12. In a delivery system as described, a power pump having a discharge capacity in excess of the delivery requirement of the system, a supply conduit leading thereto, a return conduit including injector suction creating means leading from the discharge side of the pump and discharging into the supply conduit only the excess liquid and forming therewith a circuitous path, through which the excess liquid is circulated at a high velocity, a booster in said circuitous path, said booster having a pair of outlet conduits, one of which is connected to said return conduit, while the other of said outlet conduits is connected to the power pump, and a source of liquid supply communicating with said booster from which latter additional liquid is drawn by the suction created by the flow of excess liquid in said circuitous path, in quantity sufficient to supply the delivery requirement of the system.

REUBEN G. DYKEMAN.